(12) United States Patent
Nikishov et al.

(10) Patent No.: US 11,289,820 B2
(45) Date of Patent: Mar. 29, 2022

(54) HIGH-ISOLATION ANTENNA SYSTEM

(71) Applicant: SAMSUNG ELECTRONICS CO., LTD., Suwon-si (KR)

(72) Inventors: Artem Yurievich Nikishov, Kolomna (RU); Gennadiy Aleksandrovich Evtyushkin, Moscow (RU); Elena Aleksandrovna Shepeleva, Kostroma (RU); Anton Sergeevich Lukyanov, Moscow (RU); Byung Kwan Kim, Suwon-si (KR); Jong-Sok Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 16/703,647

(22) Filed: Dec. 4, 2019

(65) Prior Publication Data

US 2020/0185834 A1    Jun. 11, 2020

(30) Foreign Application Priority Data

Dec. 10, 2018  (RU) .......................... RU2018143560
Sep. 10, 2019  (KR) ........................ 10-2019-0111979

(51) Int. Cl.
| | | |
|---|---|---|
| *H01Q 19/17* | (2006.01) | |
| *H01Q 1/52* | (2006.01) | |
| *H01Q 21/24* | (2006.01) | |
| *H01Q 21/28* | (2006.01) | |

(52) U.S. Cl.
CPC ............. *H01Q 19/17* (2013.01); *H01Q 1/521* (2013.01); *H01Q 21/24* (2013.01); *H01Q 21/28* (2013.01)

(58) Field of Classification Search
CPC ........ H01Q 19/17; H01Q 1/521; H01Q 21/24; H01Q 21/28
See application file for complete search history.

(56) References Cited

U.S. PATENT DOCUMENTS

| | | | |
|---|---|---|---|
| 7,629,939 B2 | 12/2009 | Deng et al. | |
| 8,816,921 B2 | 8/2014 | Ayatollahi | |
| 9,537,210 B2 | 6/2017 | Tatomirescu et al. | |
| 9,692,122 B2 | 6/2017 | Desclos et al. | |
| 9,806,411 B2 | 10/2017 | Hwang et al. | |
| 2011/0241950 A1 | 10/2011 | Milosavljevic et al. | |
| 2013/0335280 A1 | 12/2013 | Chen, III et al. | |
| 2014/0118191 A1* | 5/2014 | Smith | H01Q 19/30 342/372 |
| 2017/0062952 A1 | 3/2017 | Sundararajan et al. | |

FOREIGN PATENT DOCUMENTS

| | | |
|---|---|---|
| KR | 10-1727488 B1 | 4/2017 |
| WO | WO 2015/176762 A1 | 11/2015 |
| WO | WO 2017/127736 A1 | 7/2017 |
| WO | WO 2018/077408 A1 | 5/2018 |

* cited by examiner

*Primary Examiner* — Graham P Smith
(74) *Attorney, Agent, or Firm* — NSIP Law

(57) ABSTRACT

An antenna system includes a first antenna including first radiating components and first planar re-radiating components, a second antenna including second radiating components and second planar re-radiating components, and reflective components positioned between the first planar re-radiating components and the second planar re-radiating components.

22 Claims, 17 Drawing Sheets

130

130

HIGH-ISOLATION ANTENNA SYSTEM

CROSS-REFERENCE TO RELATED APPLICATIONS

This application claims the benefit under 35 USC § 119(a) of Russian Patent Application No. 2018143560 filed on Dec. 10, 2018 in the Russian Federal Service for Intellectual Property, and Korean Patent Application No. 10-2019-0111979 filed on Sep. 10, 2019 in the Korean Intellectual Property Office, the entire disclosures of which are incorporated herein by reference for all purposes.

BACKGROUND

1. Field

The following description relates to a high-isolation antenna system.

2. Description of Related Art

3D/4D radar is a key sensor component for automotive navigation. A significant feature of 3D radar is delivering a resolution of an object in one azimuth (horizontal) or elevation (vertical) plane together with the velocity of the object and the distance to the object. Alternatively, 4D radar may resolve a location of an object in both an azimuth plane and an elevation plane. To deliver ultra-high resolution, modern radar systems work with a very high number of transceiver channels. For example, modern radar systems may work with 12 transmitters and 16 receivers. Such a system may require a significantly great antenna array.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an antenna system, includes a first antenna including first radiating components and first planar re-radiating components, a second antenna including second radiating components and second planar re-radiating components, and reflective components positioned between the first planar re-radiating components and the second planar re-radiating components.

A portion of energy radiated by the first radiating components may be reflected by the reflective components and received by the second radiating components.

In response to energy being radiated by the first radiating components, a portion of the radiated energy may be received by the second radiating components through the first planar re-radiating components and the second planar re-radiating components, and another portion of the radiated energy may be received by the second radiating components through the reflective components.

The first radiating components and the second radiating components may be configured as radiating matching pairs, the first planar re-radiating components and the second planar re-radiating components may be configured as re-radiating matching pairs, and a distance between two radiating components included in one of the radiating matching pairs is less than a distance between two planar re-radiating components included in one of the re-radiating matching pairs.

The first planar re-radiating components, the second planar re-radiating components, and the reflective components may be located on a same plane.

The reflective components may be grounded.

A distance between one of the first radiating components and one of the first planar re-radiating components may be different from a distance between another one of the first radiating components and the one of the first planar re-radiating components.

The first radiating components and the second radiating components may be configured as radiating matching pairs, and a distance between two radiating components included in one of the radiating matching pairs may be different from a distance between two radiating components included in another one of the radiating matching pairs.

The first antenna may further include first feeding components, and the second antenna may further include second feeding components.

The antenna system may further include a grounding plate positioned under the first antenna and the second antenna, wherein the first feeding components are connected to the grounding plate and the first radiating components, and the second feeding components are connected to the grounding plate and the second radiating components.

The antenna system may further include a grounding plate positioned between the first radiating components and the second radiating components.

In another general aspect, an antenna system includes a first antenna comprising a first radiating component and a first planar re-radiating component, a second antenna comprising a second radiating component and a second planar re-radiating component, and a reflective component positioned between the first antenna and the second antenna.

A portion of energy radiated by the first radiating component may be reflected by the reflective component and received by the second radiating component.

In response to energy being radiated by the first radiating component, a portion of the radiated energy may be received by the second radiating component through the first planar re-radiating component and the second planar re-radiating component, and another portion of the radiated energy may be received by the second radiating component through the reflective component.

A distance between the first radiating component and the second radiating component may be less than a distance between the first planar re-radiating component and the second planar re-radiating component.

The first planar re-radiating component, the second planar re-radiating component, and the reflective component may be located on a same plane.

The reflective component may be grounded.

The first antenna may further include a first feeding component connected to the first radiating component, and the second antenna may further include a second feeding component connected to the second radiating component.

The antenna system may further include a grounding plate positioned under the first antenna and the second antenna.

In another general aspect, an antenna system includes a first antenna comprising a first radiating component and a first re-radiating component, a second antenna comprising a second radiating component and a second re-radiating component, and a reflective component positioned between the first antenna and the second antenna, configured to reflect a portion of energy radiated by the first radiating component to be received by the second radiating component.

A distance between the first radiating component and the second radiating component may be less than a distance between the first planar re-radiating component and the second planar re-radiating component.

The reflective component may be grounded.

Other features and aspects will be apparent from the following detailed description, the drawings, and the claims.

Figure 1A:
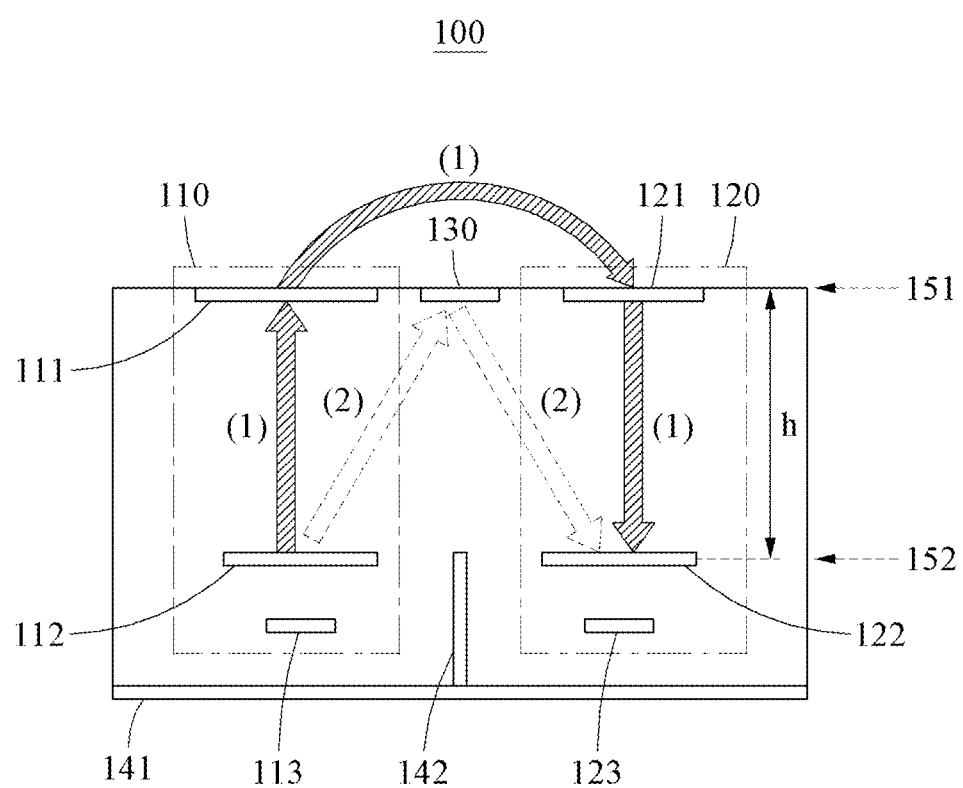
FIG. 1A illustrates an example of an antenna system including a first antenna element and a second antenna element.

Throughout the drawings and the detailed description, unless otherwise described or provided, the same drawing reference numerals will be understood to refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms, including technical and scientific terms, used herein have the same meaning as commonly understood by one of ordinary skill in the art to which this disclosure pertains after an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein. Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

Hereinafter, examples are described in detail with reference to the accompanying drawings. Like reference numerals in the drawings denote like elements.

As explained above, typical radar systems may require significant/large antenna arrays. Rather, to deliver a high-performance multiple-input and multiple-output (MIMO) antenna array for a radar system including multiple transmitter and receiver channels, it may be desired to realize a compact MIMO antenna array structure that may provide a small size and a short length for feeding lines that may help in minimizing losses at high frequencies, for example, at 79 GHz, as a non-limiting example. One or more examples below may thus demonstrate such realizations, noting examples are not limited to such realizations.

In a predetermined radar system including two or more spaced antennas, a transmitting antenna and a receiving antenna may be positioned close to each other. Thus, there may be a parasitic leakage of electromagnetic radiation from one antenna to another antenna. When the quantity of parasitic radiation is great, the antenna sensitivity may decrease accordingly. Thus, it may be helpful to provide a high isolation between the transmitting antenna and the receiving antenna.

In general, an isolation between a transmitting element corresponding to a transmitting antenna and a receiving element corresponding to a receiving antenna may be provided by increasing the distance between these elements. The increase in the distance between the elements may affect the size of an antenna array and the length of a feeding line of each of the transmitting element and the receiving element. However, when the transmitting and receiving elements are disposed close to each other in order to decrease the size of an antenna array, the receiving element may be blocked by a parasitic signal of the transmitting element, and thus the dynamic range and the sensitivity of the radar system may decrease. Herein, the term element means a hardware, hardware component, organized combination of physical materials, a formed physical material, etc. For example, in an example, a transmitting element may be an antenna configured for transmission and a receiving element may be an antenna configured for receiving.

Examples may increase high isolation between a receiving element and a transmitting element in a manner other than increasing the distance between these elements. Furthermore, examples may be readily applicable to a multiple-input and multiple-output (MIMO) antenna array and a printed circuit board (PCB) structure.

The technical results achieved through examples may include ways for providing high isolation between a transmitting element, also referred to as a second antenna element, and a receiving element, also referred to as a first antenna element, of an antenna array positioned close to each other. A distance between phase centers of the transmitting element and the receiving element may be up to $\lambda/2$. Here, $\lambda$ denotes the length of an electromagnetic wave in the frequency rage of an active antenna element. At the same time, the length of feeding lines and a resulting loss may decrease. Furthermore, because it is possible to dispose the transmitting element and the receiving element very close to each other, a compact multiple-input and multiple-output (MIMO) antenna array for 3D/4D radar may be provided.

Figure 1B:
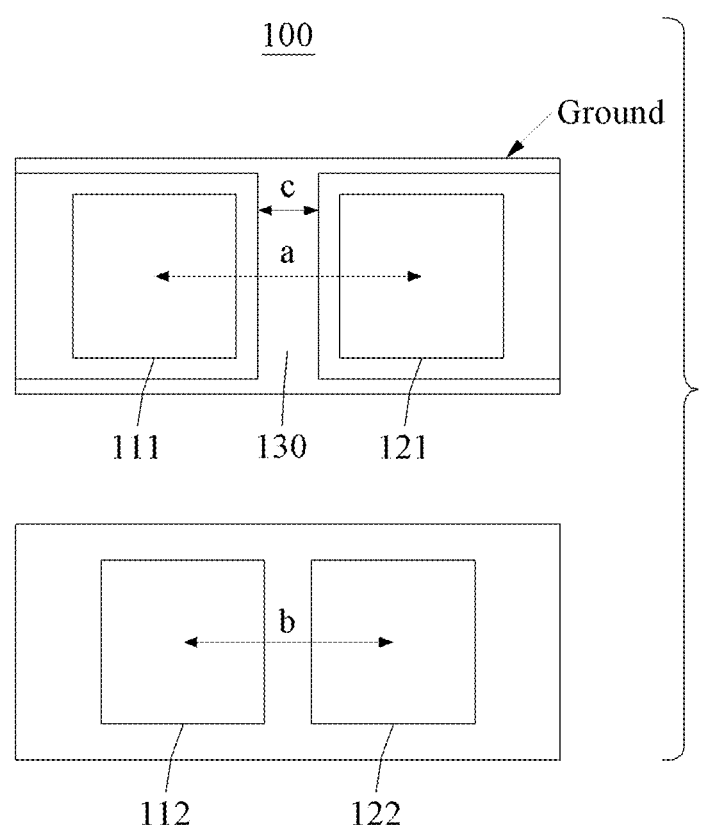
FIG. 1B illustrates an example of radiating elements and planar re-radiating elements.

FIG. 1A illustrates an example of an antenna system including a first antenna element and a second antenna element, and FIG. 1B illustrates an example of radiating elements and planar re-radiating elements.

Referring to the example of FIG. 1A, an antenna system 100 may include a first antenna element 110 and a second antenna element 120. The first antenna element 110 may correspond to a transmitting antenna, and the second antenna element 120 may correspond to a receiving antenna.

The first antenna element 110 may include at least one radiating element 112 and at least one planar re-radiating element 111. The radiating element 112 and the planar re-radiating element 111 may each have a planar shape. For example, the radiating element 112 and the planar re-radiating element 111 may each correspond to a microstrip, such as a patch, or a slot. The radiating element 112 may correspond to a radiating component, and the planar re-radiating element 111 may correspond to a re-radiating component. In general, where the present disclosure refers to an element, the element corresponds to an appropriate component. The planar re-radiating element 111 may be positioned at a distance h in a vertical direction above the radiating element 112. The second antenna element 120 may also include at least one radiating element 122 and at least one planar re-radiating element 121. The description of the first antenna element 110 may also apply to the second antenna element 120, and further detailed description is omitted for brevity.

Subsequently, the radiating elements 112 and 122 are referred to as a radiating element pair, and the planar re-radiating elements 111 and 121 are referred to as a planar re-radiating element pair. These elements are also referred to as matching pairs or simply as pairs. When the first antenna element 110 and the second antenna element 120 each include a plurality of radiating elements, two radiating elements positioned on the same plane may correspond to a radiating element pair. Such criteria may also apply to planar re-radiating elements.

Feeding elements 113 and 123 may be positioned at a predetermined distance in a vertical direction below the radiating elements 112 and 122, and corresponding feeding lines may be provided to the feeding elements 113 and 123. Further, a grounding plate 141 may be positioned at the bottom of the antenna system 100. An additional grounding plate 142 may be positioned between the feeding elements 113 and 123 and between the radiating elements 112 and 122, such that a direct propagation of a signal between the elements may be prevented. In such an example, a medium between the radiating elements 112 and 122 and the planar re-radiating elements 111 and 121 may have an effective dielectric permittivity $\varepsilon_{eff}$.

Top or plan views demonstrated by FIG. 1B correspond to planes 151 and 152. Referring to the example of FIG. 1B, the radiating element 112 of the first antenna element 110 and the radiating element 122 of the second antenna element 120 may be positioned at a distance b from each other in a horizontal direction, and the planar re-radiating element 111 and the planar re-radiating element 121 may be positioned at a distance a from each other in a horizontal direction. For example, a and b may each have a value of $\lambda/2$ or about $\lambda/2$, as defined above, in view of a possible variation of ±20% occurring due to by technical limitations and other limitations, as a non-limiting example.

In an example, a reflective element 130 may be provided between the planar re-radiating elements 111 and 121. For example, the reflective element 130 may be grounded. In a particular example, the reflective element 130 may be connected to a grounding plate 141. The reflective element 130 may have a characteristic length $c<\lambda/2$.

The reflective element 130 may provide an additional path (2) from the first antenna element 110 to the second antenna element 120. Thus, the antenna system 100 may have two parasitic leakage paths, a main path (1) passing through the planar re-radiating elements 111 and 121 and the direct additional path (2) passing between the radiating elements 112 and 122 and through the reflective element 130. In response to being reflected by the reflective element 130, a parasitic signal may be combined in antiphase with a signal reflected from the reflective element 130, which is described in greater detail further below.

Assuming that a and $\alpha$ denote an amplitude and a phase of a signal propagated along the main path (1), respectively, and a' and $\alpha'$ denote an amplitude and a phase of a signal propagated along the additional path (2), respectively, the resonance condition for high isolation may be expressed as $a-a'\cong 0$ and $\alpha-\alpha'\cong\pi$. Thus, while such a resonance condition may be satisfied, the signal passing along the main path (1) may be compensated for by the signal passing along the additional path (2), e.g., such that transmission of a signal by transmitting element 110 may be isolated from reception by receiving element 120. The resonance condition may be achieved by adjusting the parameters a, b, c and/or h.

Figure 2A:
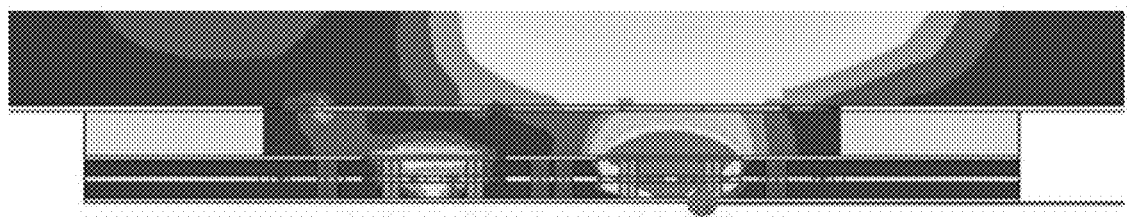
FIG. 2A illustrates an example of energy radiated in response to a signal being transmitted from a first antenna element to a second antenna element in a situation where a reflective element is absent.
Figure 2B:
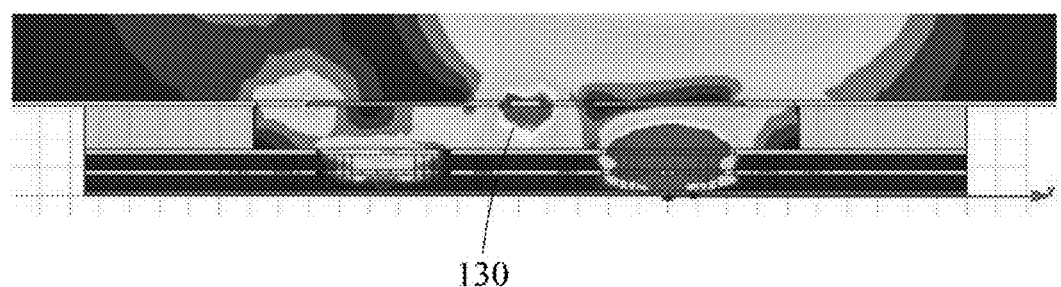
FIG. 2B illustrates an example of energy radiated in response to a signal being transmitted from a first antenna element to a second antenna element in a situation where a reflective element is present.
Figure 2C:
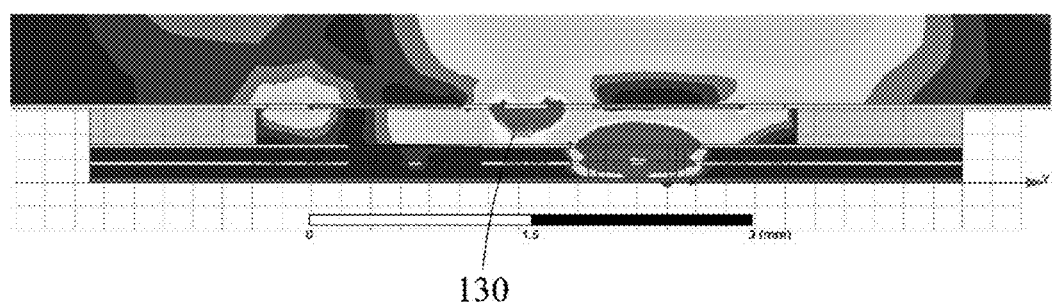
FIG. 2C illustrates an example of energy radiated in response to a signal being transmitted from a first antenna element to a second antenna element in a situation where a reflective element is present.

FIGS. 2A, 2B and 2C illustrate examples of energy radiated in response to a signal being transmitted from a first antenna element to a second antenna element in three different implementations of antenna systems.

FIG. 2A illustrates an example where a reflective element, e.g., reflective element 130, is not provided in an antenna system. Thus, in such an example, there is no additional path for propagating radiated energy. In this example, an isolation index may be about −17 dB. In this typical antenna system, the antenna array may be designed such that a distance between planar re-radiating elements of a first antenna element and a second antenna element may be equal to a distance between radiating elements between the first antenna element and the second antenna element. For ease of description, the antenna system of the example of FIG. 2A may be referred to as the typical antenna system.

FIG. 2B illustrates an example where a reflective element is added to an antenna system and an additional path for radiated energy is provided. In this example, an isolation index may be about −25 dB. FIG. 2C illustrates an example where a reflective element is added to an antenna system, an additional path for radiated energy may be provided, and a predetermined parameter may be adjusted, e.g., with the parameters b and h, being different between FIGS. 2B and 2C. For example, the parameters a, h and c may be fixed, and the parameter b may be adjusted to achieve the highest isolation. In such an example, the parameter b, related to a distance between radiating elements of the first antenna element and the second antenna element, may be adjusted to a new value, b'. In such an example, an isolation index may be about −45 dB.

To achieve high isolation, that is, to minimize the isolation index, a portion of the parameters may be adjusted. Adjusting the parameter b, such as demonstrated in FIG. 2B, may be significant in that adjusting the parameter b may enable the performance characteristics of the antenna array to be maintained by fixing the parameter h and the parameter a. In such an example, the parameter h may denote a distance between a location plane of the radiating elements and a location plane of the planar re-radiating elements. Also, in such an example, the parameter a may denote a distance between planar re-radiating elements of the first antenna element and the second antenna element. The performance characteristics may correspond to a distance between matching antenna elements.

Figure 3:
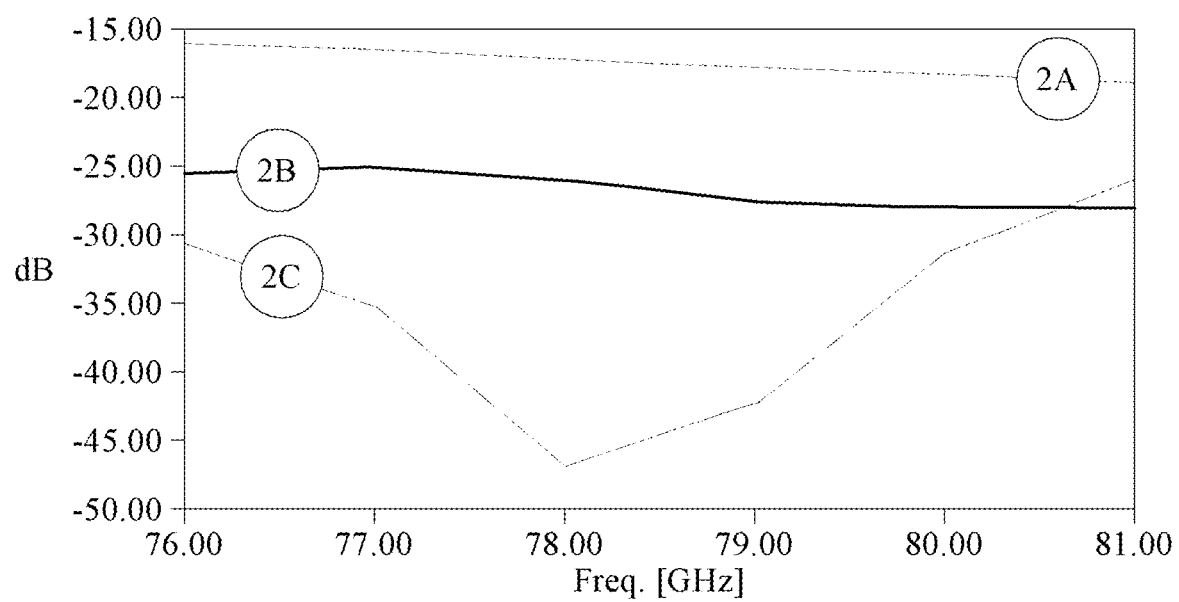
FIG. 3 illustrates examples of an isolation index changing in response to a signal being transmitted from a first antenna element to a second antenna element in three different implementations of antenna systems.

FIG. 3 illustrates examples of an isolation index changing in response to a signal being transmitted from a first antenna element to a second antenna element in three different implementations of antenna systems. Referring to the example of FIG. 3, changes of an isolation index in response to a signal being transmitted from a first antenna element to a second antenna element in the three different implementations of the antenna systems of the examples of FIGS. 2A, 2B and 2C, are illustrated. In particular, a frequency range of 76 GHz to 81 GHz is considered. Such a frequency range may be used for radar systems for autonomous vehicles.

FIG. 3 demonstrates that the isolation index of the examples of FIGS. 2A and 2B does not vary greatly depending on a frequency in different examples, e.g., of FIGS. 2B and 2C. However, the isolation index of the example of FIG. 2C reaches the minimum value −47 dB at a frequency of 76 GHz. That is, by adjusting the parameter b to achieve high isolation, as in the example of FIG. 2C compared to the example of FIG. 2B, the minimum value of the isolation index may be achieved at a predetermined frequency. Because the minimum value may be achieved at a predetermined frequency, such high isolation may accordingly correspond to an example of a narrow band.

In an example, the isolation index may be changed by adjusting the parameter b while fixing the parameters a, h and c. In another example, the parameters a and c may be fixed, and the parameter b and the parameter h may be adjusted. Then, the frequency may be controlled in a state where the isolation index reaches a minimum value. Such a latter example is described in greater detail further below.

Figure 4:
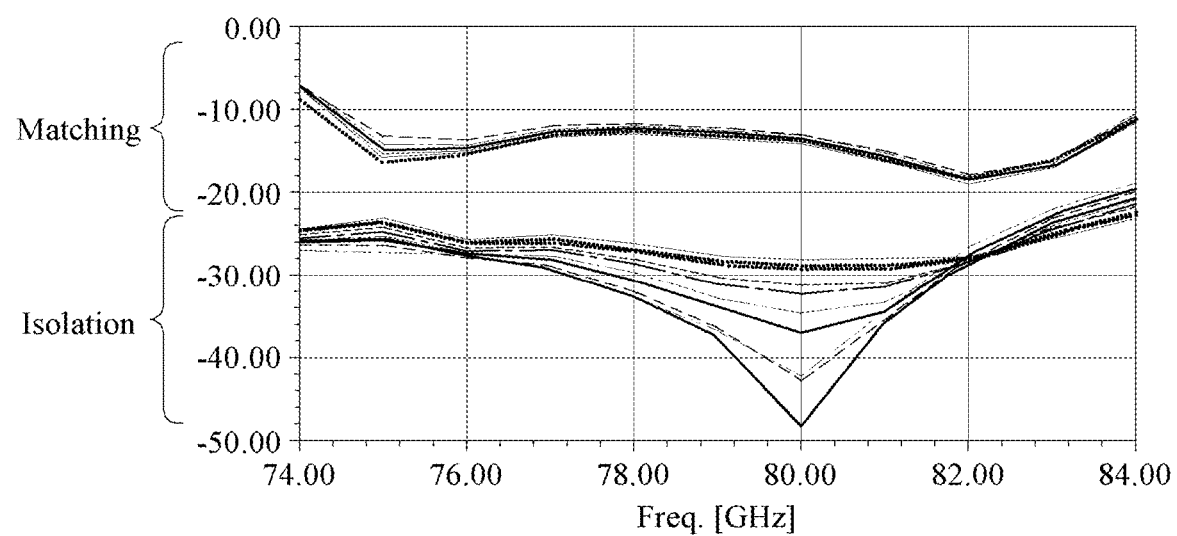
FIG. 4 illustrates examples of an isolation index and a matching level changing in response to a parameter b being adjusted.

FIG. 4 illustrates examples of an isolation index and a matching level changing in response to a parameter b being adjusted. Referring to the example of FIG. 4, an isolation index and a matching level may change in response to a signal being transmitted from a first antenna element to a second antenna element, depending on adjustments of the parameter b in the frequency range of 76 GHz to 81 GHz.

As described above, in the typical antenna system, a distance a between planar re-radiating elements may be equal to a distance b between radiating elements. When a reflective element is added to such a configuration, the isolation index in the frequency range of 76 GHz to 81 GHz may have a value ranging of about −30 dB to about −25 dB, and also does not reach a lower isolation index at any frequency, in an example However, as shown in the example of FIG. 4, when the parameter b is adjusted, the isolation index may reach a minimum value. In such an example, the antenna system may be configured with the parameter b being less than the parameter a. For example, when the parameter b has a value obtained by subtracting 0.32 mm from the parameter a, a minimum value of the isolation index may reach about −47 dB if the frequency is 80 GHz, in the example of FIG. 4.

Furthermore, the graph of the example of FIG. 4 shows that the matching level of the antenna elements of the system may change within the range of −9 dB to −20 dB when the parameter b is adjusted to different values. Although the parameter b may be changed, self-matching of the antenna elements does not change or hardly changes operational characteristics. Thus, it may be verified that schemes according to an example of improving isolation between a receiving element and a transmitting element do not affect matching of the elements, leading to improved isolation without detriment to the matching.

Figure 5:
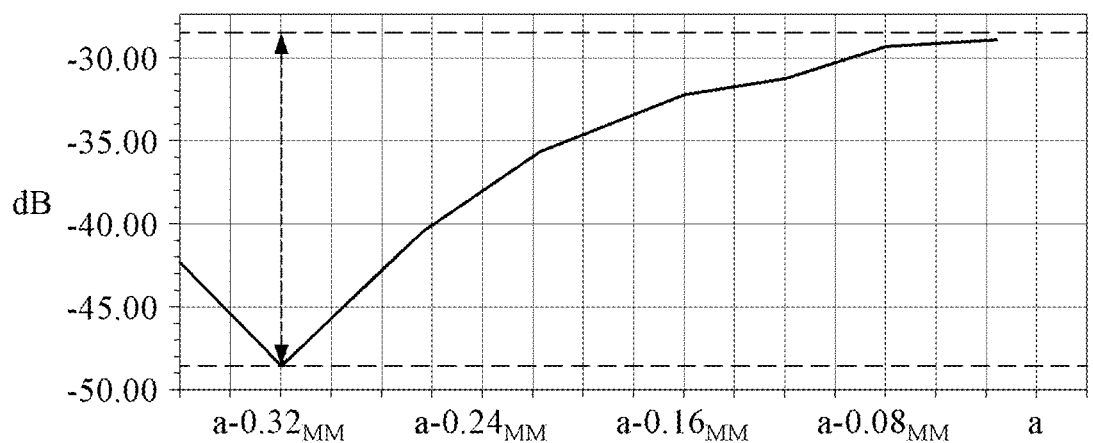
FIG. 5 illustrates an example of an isolation index that is dependent on a parameter b.

FIG. 5 illustrates an example of an isolation index dependent on a parameter b, e.g. in an antenna system example with a reflective element. In particular, in the example of FIG. 5, in view of a frequency of 80 GHz, an isolation index of an example of b=a−0.32 mm may improve by about 20 dB by comparison to an isolation index of an example of b=a. A minimum isolation index may be obtained by adjusting the parameter h while fixing the parameters a, c and b. In such an example, the parameter h may correspond to a distance between a location plane of radiating elements and a location plane of planar re-radiating elements.

Figure 6:
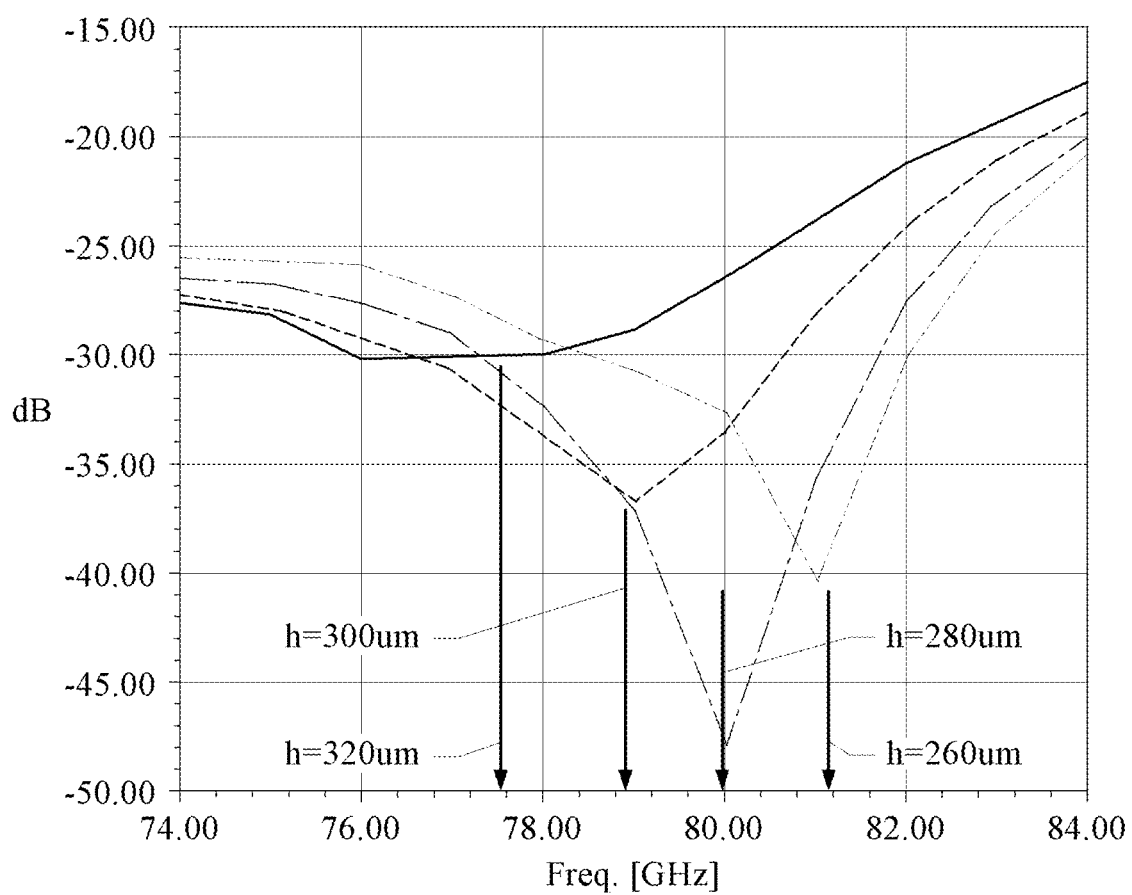
FIG. 6 illustrates examples of an isolation index changing in response to a parameter h being adjusted.

FIG. 6 illustrates examples of an isolation index changing in response to a parameter h being adjusted, e.g. in an antenna system example with a reflective element. Referring to the example of FIG. 6, an isolation index in the frequency range of 76 GHz to 81 GHz is illustrated as changing in response to the parameter h being changed. As shown in the graph of the example of FIG. 6, if the parameter h is 280 µm, the isolation index at the frequency of 80 GHz may have a minimum value of about −47 dB. If the parameter h is 260 µm, the isolation index may have a lower value than when the parameter h is 300 µm or 320 µm. An example of fixing the parameters a and c and adjusting the parameters b and h may be further considered. Such an example is discussed in greater detail, below.

Figure 7:
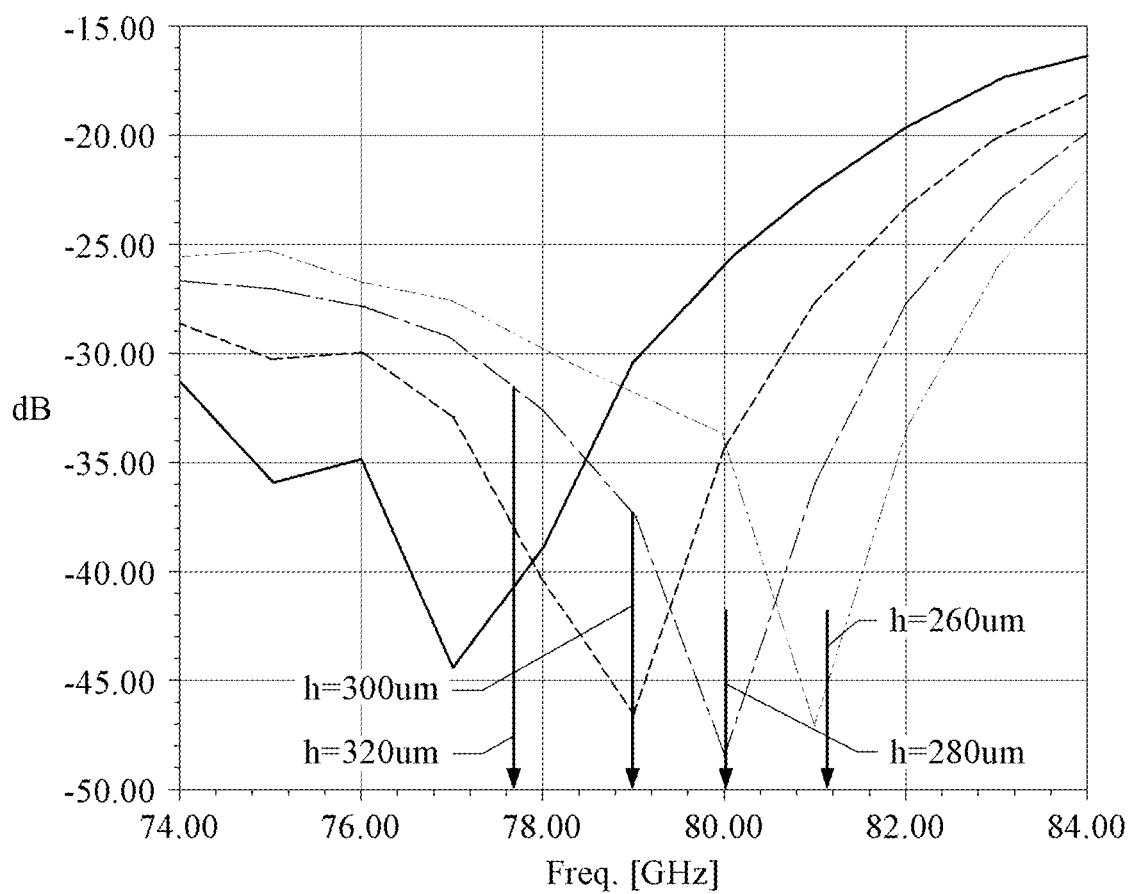
FIG. 7 illustrates an example of an isolation index changing in response to parameters b and h being adjusted.

FIG. 7 illustrates an example of how an isolation index may change in response to parameters b and h being adjusted, e.g. in an antenna system example with a reflective element. The example of FIG. 7 shows an isolation index changing in the frequency range of 76 GHz to 81 GHz. The parameter h may be adjusted to values close to those of the parameter h, as considered in the adjustments made in the example of FIG. 6. However, as shown in the example of FIG. 7, the values of the isolation index may decrease further in response to the additional adjustment of the parameter b.

FIG. 7 shows that the isolation index reaches the minimum value when the parameter h is adjusted to have values of 320 µm, 300 µm, 280 µm and 260 µm, and the parameter b is adjusted to 1.42 mm (2*(a/2−0.24 mm)), 1.5 mm (2*(a/2−0.2 mm)), 1.58 mm (2*(a/2)−0.16 mm)) and 1.66 mm (2*(a/2−0.12 mm)) at the frequencies of 77 GHz, 79 GHz, 80 GHz, and 81 GHz. Thus, in examples with such varied parameter b and the parameter h, an example minimum value of the isolation index may successfully be achieved at varied frequencies. This result indicates that high isolation may be applicable to an ultra-wide band. However, matching of the antenna elements may decrease when the parameter h changes.

In an example in which the parameter c corresponding to the length of the grounded reflective element is adjusted, it may be desirable to select a maximum value of the parameter c allowable by the different applied antenna manufacturing technologies and the current antenna configuration, in order to achieve an example minimum value of the isolation index. In an example approach for implementation, the parameter a, corresponding to a distance between planar re-radiating elements, may be 1.9 mm, and a half of the length of the planar re-radiating elements may be 0.55 mm. If a minimum allowable gap between metallic elements is 0.1 mm, the antenna system may include a grounded reflective element having the length of 0.6 mm or 600 µm.

According to examples, to achieve high isolation with respect to a narrowband antenna of a predefined specific frequency and a wideband antenna, an aperiodic structure of a specialized antenna element may be considered. A first antenna element and a second antenna element may each include N radiating elements and N planar re-radiating elements. The N radiating elements may be fed in series from a single port through feeding elements. In such an example, the distances between the radiating and planar re-radiating elements may be changed to provide high isolation in the ultra-wide band operation.

Figure 8A:
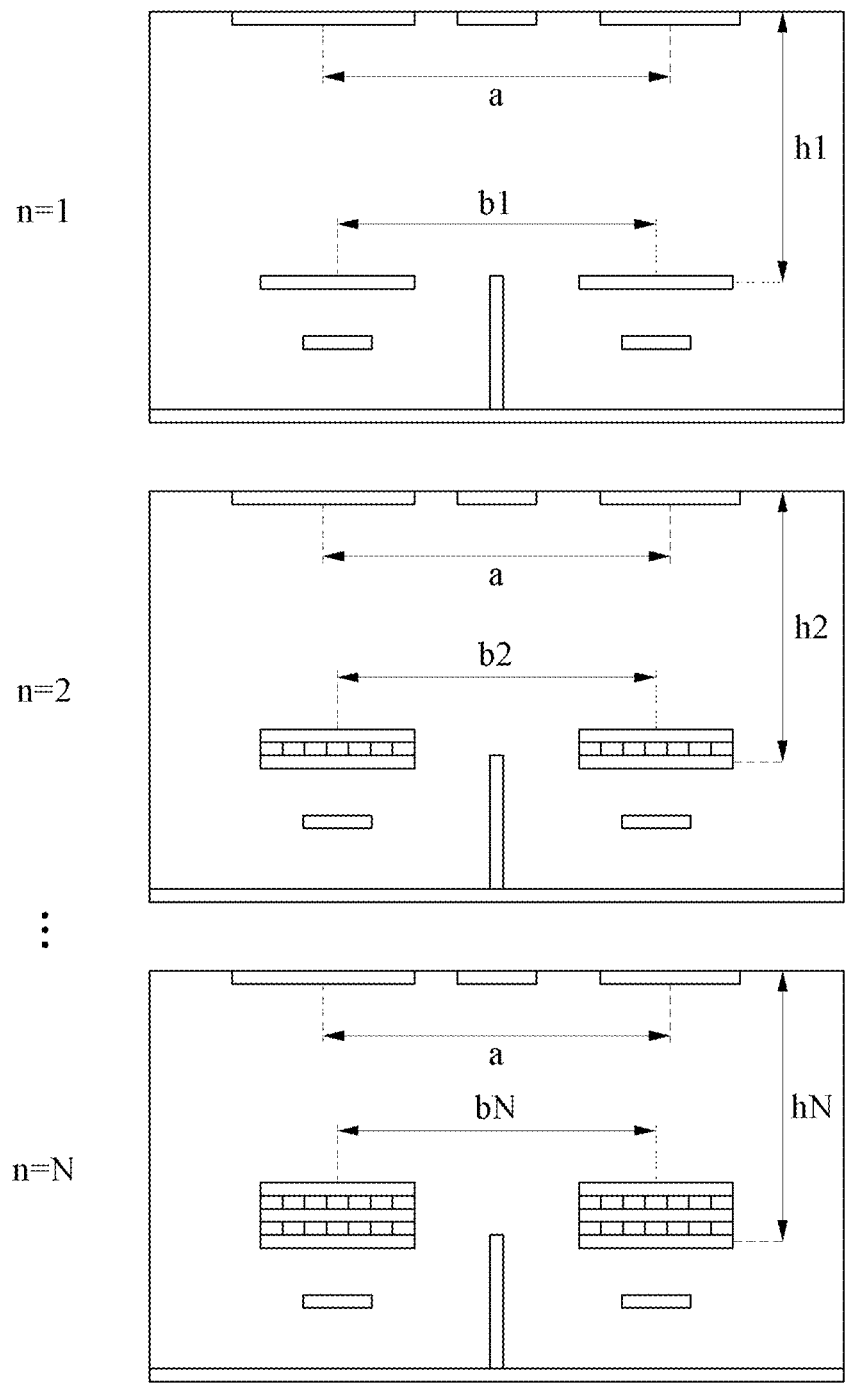
FIG. 8A illustrates an example of an antenna system including N first antenna elements and N second antenna elements.
Figure 8B:
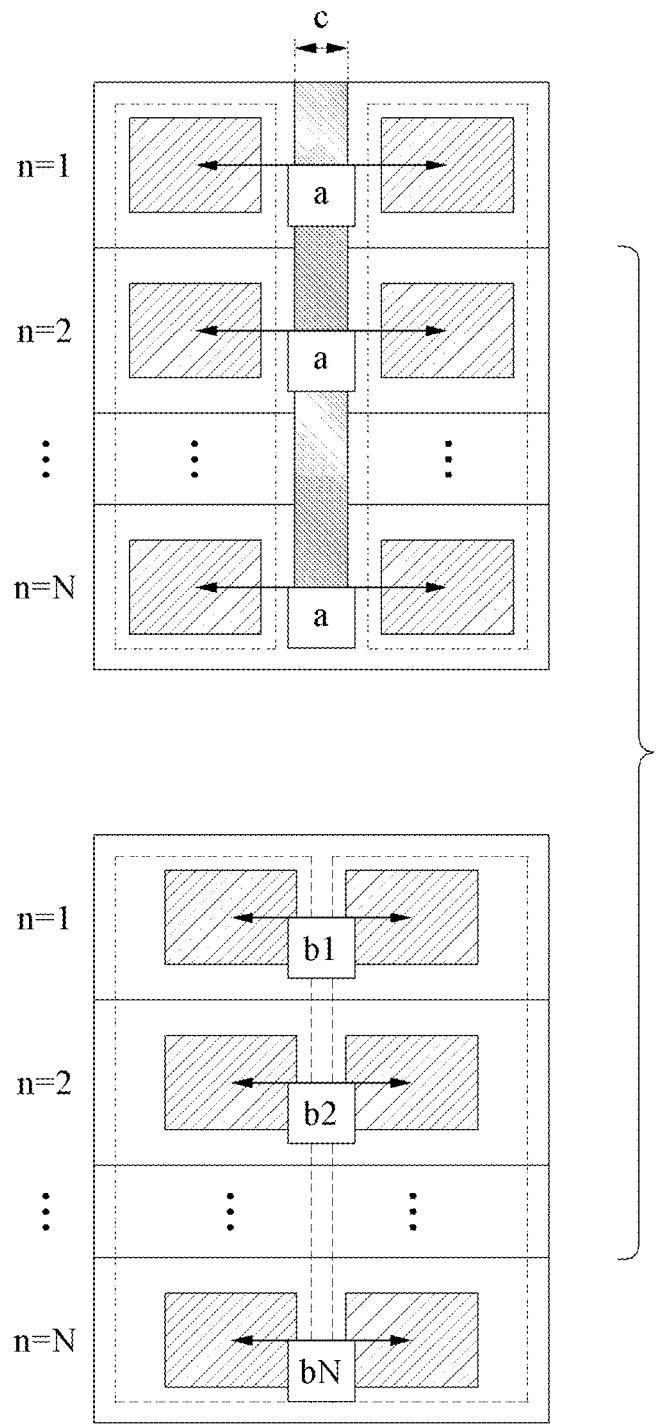
FIG. 8B illustrates an example of N successive radiating elements and N successive planar re-radiating elements.

FIG. 8A illustrates an example of an antenna system including N first antenna elements and N second antenna elements, e.g. in an antenna system example with a reflective element. FIG. 8B illustrates an example of N successive radiating elements and N successive planar re-radiating elements. When n is defined as the number of radiating elements and planar re-radiating elements, the parameters h and b may be indicated as being $h_N$ and $b_N$, if n=N. In such an example, it may be assumed that resonance occurs at $\lambda_N$. As described with respect to narrow band operation, the parameters $h_n$ and $b_n$ of the antenna system may be adjusted to obtain an isolation index for an ultra-wide band of planar re-radiating elements of two antenna arrays, spaced by a distance of λ/2 or about λ/2, such as a distance reflecting the variation of ±20%, as described above.

A result isolation index may indicate a superposition of the isolation index at each frequency of ultra-wide band. In general, $h_1, h_2, \ldots, h_N$ may be the same or different from one another. For example, each element may form its own resonance. Thus, various combinations may be possible to satisfy hardware requirements or to achieve a required isolation index. For example, if N=3, combinations of $(h_1) < (h_2) < (h_3)$ and $(b_1) < (b_2) < (b_3)$ may be possible in an example where a three-resonance isolation is achieved. Furthermore, if N=6, combinations of $(h_1 = h_2 = h_3) < (h_4 = h_5 = h_6)$ and $(b_1 = b_2 = b_3) < (b_4 = b_5 = b_6)$ may be possible in an example where a two-resonance isolation is achieved. Simultaneous superposition may provide for a wide-band isolation operation. If the number of resonance isolations achieved is k, it may be indicated or referred to as exhibiting k-resonance.

Figure 9:
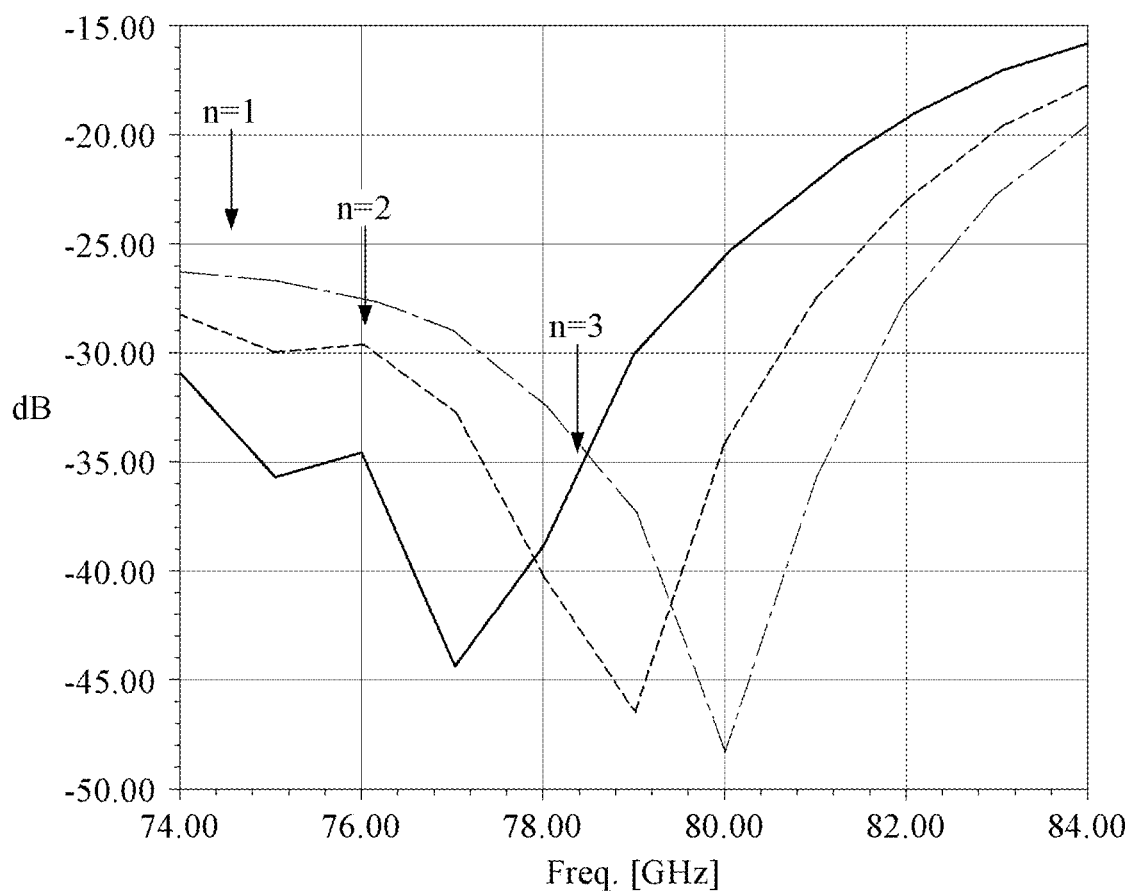
FIG. 9 illustrates examples of an isolation index changing for respective configurations of antenna systems if N=3.

FIG. 9 illustrates examples of an isolation index changing for respective configurations of antenna systems if N=3, e.g. with a configuration of FIG. 8A. Each configuration of an example antenna system may include a first antenna element and a second antenna element. The example of FIG. 9 shows an experiment result of an example within the frequency range of 74 GHz to 84 GHz. As shown in the previous example, resonance may occur at frequencies of 77 GHz, 79 GHz and 80 GHz.

According to a graph of the example of FIG. 9, for n=1, a minimum isolation index of about −47 dB may be obtained at the frequency of 80 GHz by adjusting parameters $h_1$ and $b_1$. For n=2, a minimum isolation index of about −46 dB may be obtained at the frequency of 79 GHz by adjusting parameters $h_2$ and $b_2$. For n=3, a minimum isolation index of about −44 dB may be obtained at the frequency of 77 GHz by adjusting parameters $h_3$ and $b_3$. Thus, a high isolation may be provided with respect to each pair of the adjusted parameters.

Figure 10:
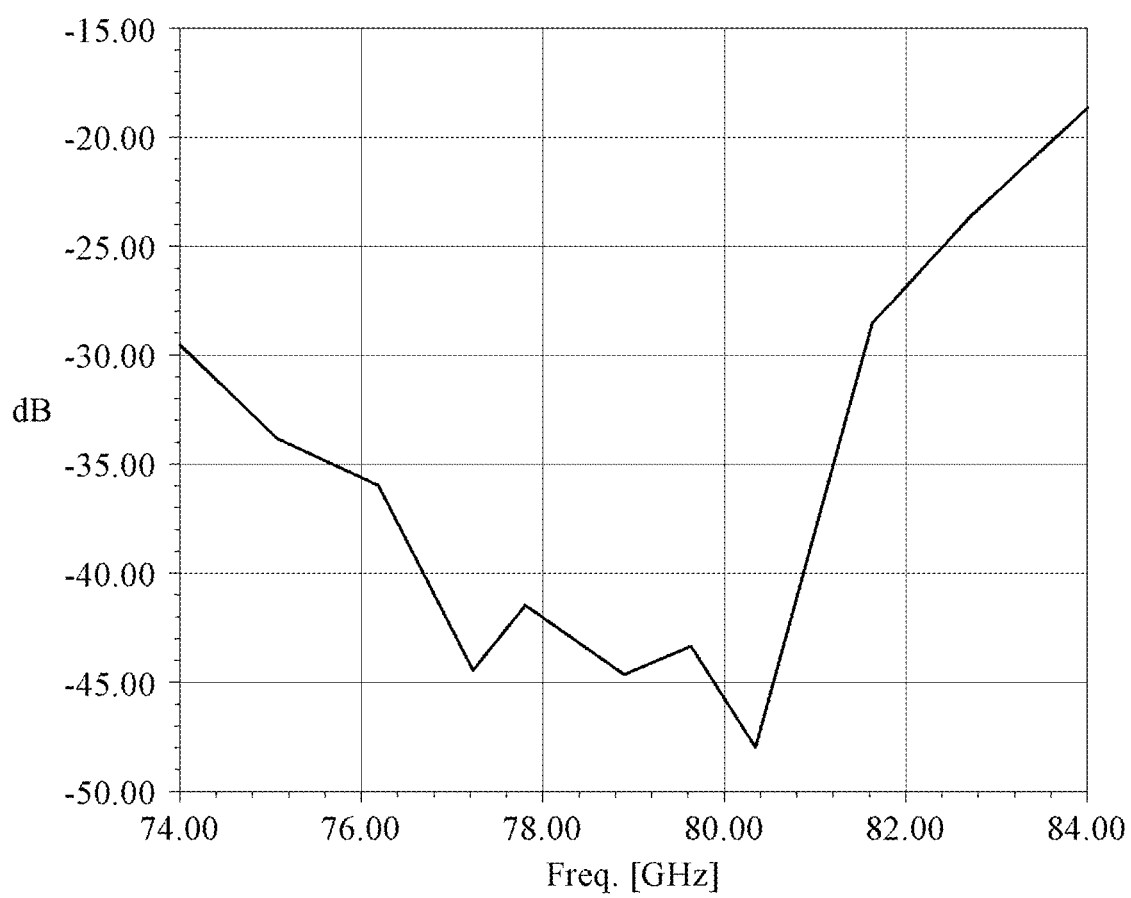
FIG. 10 illustrates a result isolation index with respect to the isolation index of FIG. 9.

FIG. 10 illustrates a result isolation index with respect to the isolation index of the example of FIG. 9. Isolation indices of respective frequencies shown in a graph of the example of FIG. 9 are added up according to ultra-wide band superposition.

When an antenna system is implemented as described above, a result isolation index may be determined based on a superposition of isolation indices with respect to respective configurations. Thus, the result isolation index may reach the minimum values at a number of frequencies. For example, in the example of FIG. 9, the isolation index may reach the minimum values at frequencies of 77.1 GHz, 78.9 GHz and 80.4 GHz. In such an example, the corresponding values of the isolation index may be −44 dB, −45 dB and −48 dB. Thus, the improvement of isolation within the provided frequency range may be achieved through 3 frequencies, as discussed further, above.

Implementation of an isolated structure for multi-resonance or k-resonance, as discussed above, becomes a relatively complex task in such varied examples due to technical limitations for producing a printed circuit board (PCB) with such example provisions discussed above. For example, as the number of resonances or k increases, the structure is implemented in a more complicated manner in such varied examples. In such an example, a significant issue may be to provide a condition for implementing a parameter $h_n$ having a sufficiently small value.

The frequency range, for example, a range of 76 GHz to 81 GHz, discussed above may correspond to a range of frequencies available for autonomous vehicle examples. In this example, a value of a parameter h may generally range from 320 μm to 260 μm. The value of the parameter h has been already discussed above. Thus, the range of change in the value of parameter h may be 60 μm, and current alternative PCB production technology may provide the layer thickness of about 50-60 μm in view of the thickness of the copper. This approach indicates that when a minimal layer with the thickness of 50 to 60 μm is used in an application example, the resulting maximum number of resonance frequencies is 2. In such an example, wide-band isolation may be implemented at two frequencies, as is discussed further in the following example.

Figure 11A:
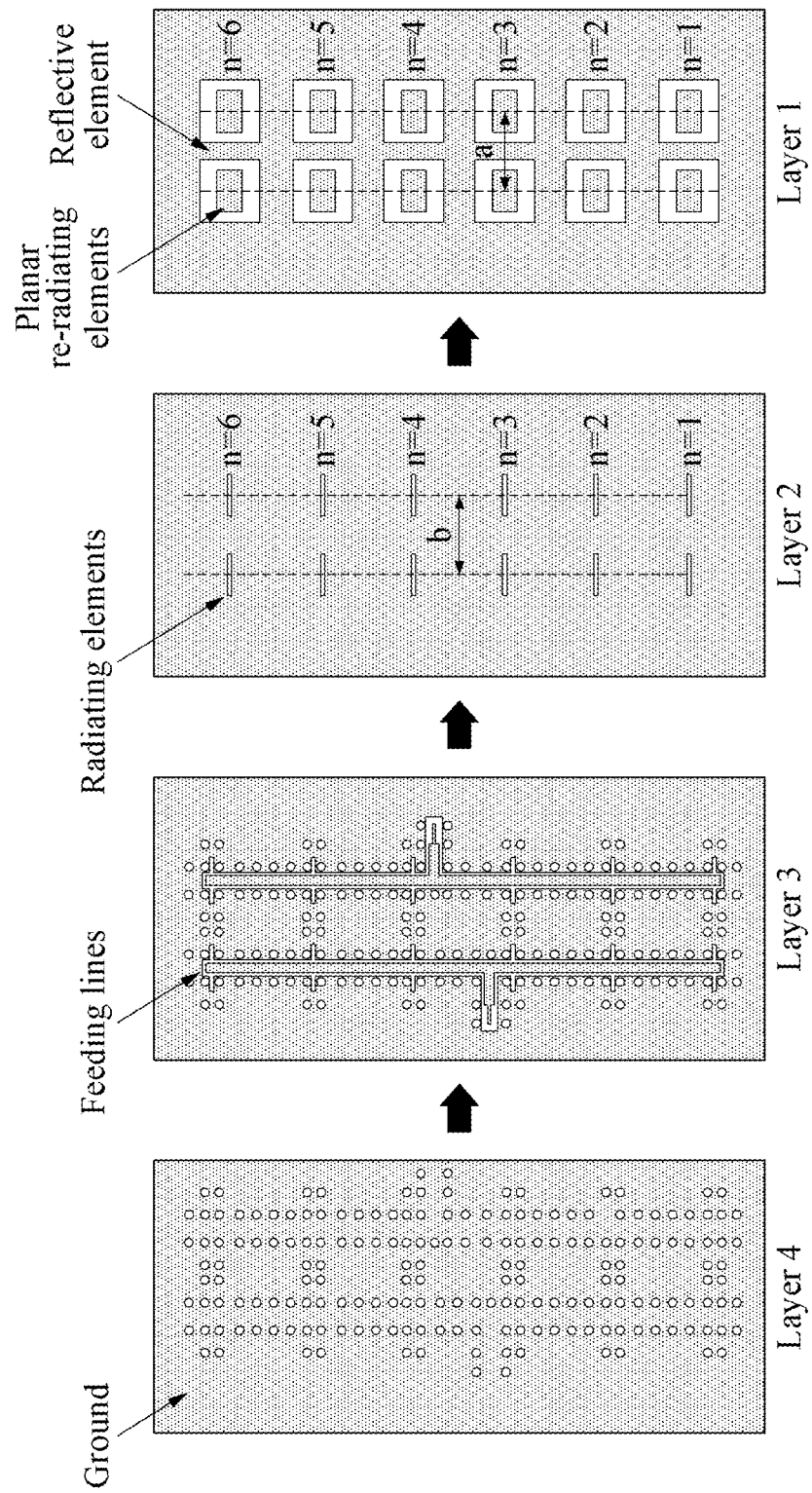
FIG. 11A illustrates an example of a layered 1-resonance structure of antenna elements.

FIG. 11A illustrates an example of a layered 1-resonance structure of antenna elements. In the structure of the example of FIG. 11A, a first layer on the top may include 6 pairs of planar re-radiating elements, and a grounded reflective element may be provided between each pair of planar re-radiating elements. Based on the criteria described above, the structure of FIG. 11A may correspond to an example of N=6. The distance between each pair of planar re-radiating elements in the first layer may be the same. A second layer may include 6 pairs of radiating elements. The distance between each pair of radiating elements may correspond to the parameter b. A third layer may include feeding elements and feeding lines connected to the feeding elements. A fourth layer may be a grounding plate. As described above, the distance between the first layer and the second layer may correspond to the parameter h.

Figure 11B:
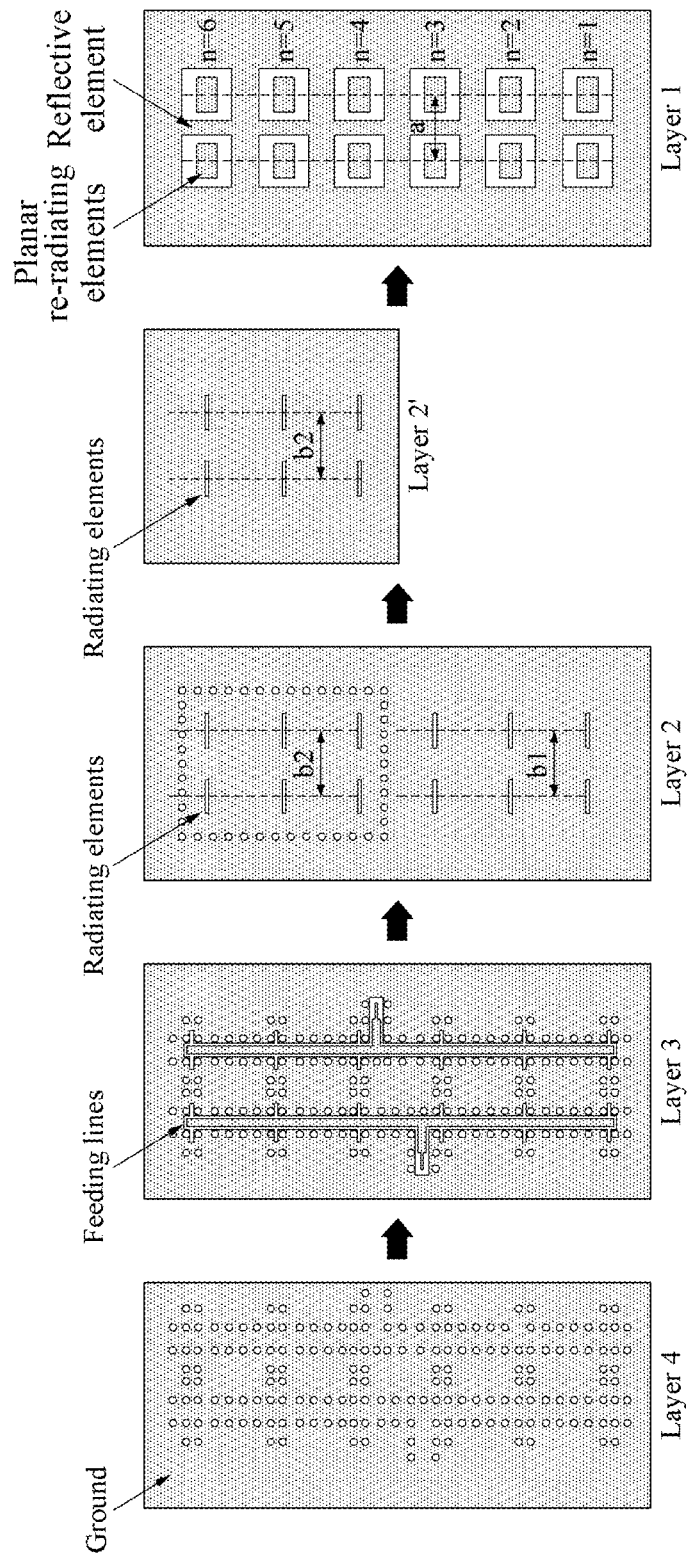
FIG. 11B illustrates an example of a layered 2-resonance structure of antenna elements.

FIG. 11B illustrates an example of a layered 2-resonance structure of antenna elements. In the structure of the example of FIG. 11B, a first layer on the top may include 6 pairs of planar re-radiating elements. A grounded reflective element may be provided in each pair of planar re-radiating elements. In such an example, N=6, and the distance between each pair of planar re-radiating elements may be the same. A second layer may include 6 pairs of radiating elements. A third layer may include feeding elements and feeding lines, similar in structure to those of the 1-resonance structure. A fourth layer may be a grounding plate.

In addition, to extend a bandwidth, that is, to implement a wide band, an additional copper layer, hereinafter, referred to as a second' layer, may be included between the first layer including the planar re-radiating elements and the second layer including the radiating elements. Here, the second' layer may include 3 pairs of radiating elements, and thus may be superposed only with respect to half of the second layer. Thus, the first layer may be positioned at a distance h1 from the second layer, and at a distance h2 from the second' layer. Here, h1>h2.

A difference between h1 and h2 may be equal to the thickness, for example, about 50 to 60 μm, of the added second' layer. Thus, radiating elements of each radiating element pair of the second' layer may be positioned at a distance b2 from each other, and 3 pairs of radiating elements may be superposed with radiating elements of each radiating element pair of the second' layer, from among 6 pairs of radiating elements of the second layer, may also be positioned at the distance b2 from each other. Thus, the 3 pairs of radiating elements of the second layer and the 3 pairs of radiating elements of the second' layer may form corresponding groups of the pairs with respect to each of the first antenna element and the second antenna element.

The remaining 3 pairs of radiating elements, namely, the other groups of pairs of radiating elements of the first antenna element and the second antenna element, in the second layer may be positioned at a distance b1 from each other. Because the distance between the second layer and the second' layer is a small distance and thus these layers are close to one another, radiation of the radiating elements of the second' layer may be the same as radiation of the radiating elements of the second layer.

As described above, frequencies, more particularly resonance frequencies, may be selected by adjusting the parameters b2 and h2 for a first frequency, and by adjusting the parameters b1 and h1 for a second frequency. For example, adjusting such parameters in various examples may lead to various desired performance characteristics. Such an example indicates that the distance between specific pairs of radiating elements and planar re-radiating elements may be adjustable by adding an additional layer, for example, an additional group of additional radiating elements of the first antenna element and an additional group of additional radiating element of the second antenna element, to the antenna structure. The number of radiating element pairs of each group to be added may be adjusted accordingly to achieve a desired result.

Figure 12A:
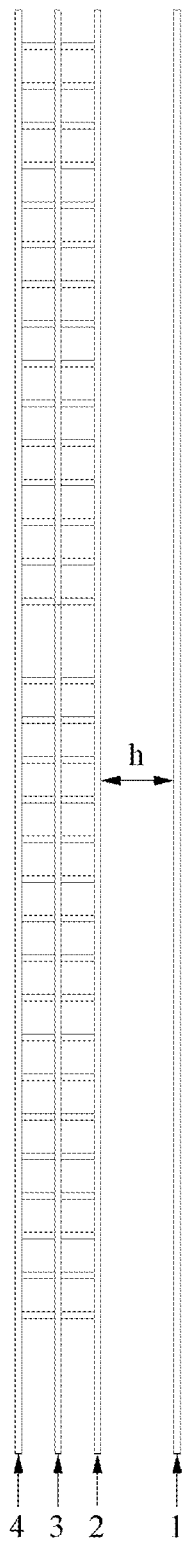
FIGS. 12A and 12B illustrate the layered 1-resonance structure and the layered 2-resonance structure of the antenna elements of the examples of FIGS. 11A and 11B.
Figure 12B:
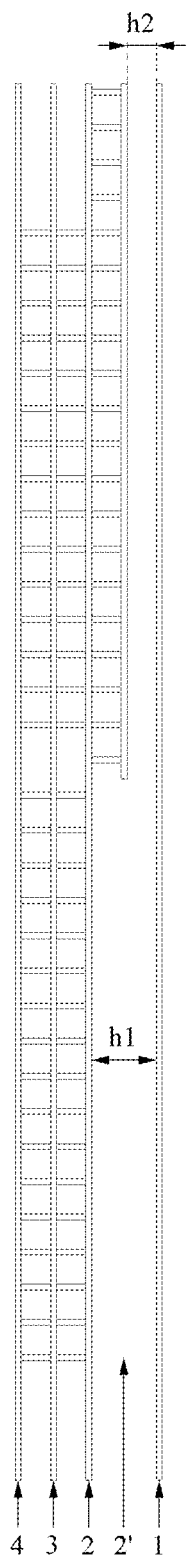

FIGS. 12A and 12B illustrate the layered 1-resonance structure and the layered 2-resonance structure of the antenna elements of the examples of FIGS. 11A and 11B. In FIGS. 12A and 12B, numbers in the drawings may correspond to respective layers.

Alternatively, when implementing the 2-resonance structure, the second' layer may be overlaid on the first layer, rather than on the second layer. In such an example, the second' layer may be overlaid on a portion of the first layer of the 2-resonance structure. For example, the planar re-radiating elements, for example, 3 pairs, of the second' layer may be overlaid on a portion, for example, 3 pairs, of the planar re-radiating elements of the first layer. In such an example, the distance between the second' layer and the second layer is h2, and the distance between the first layer and the second layer is h1. Also, in this example, h1>h2.

Figure 13:
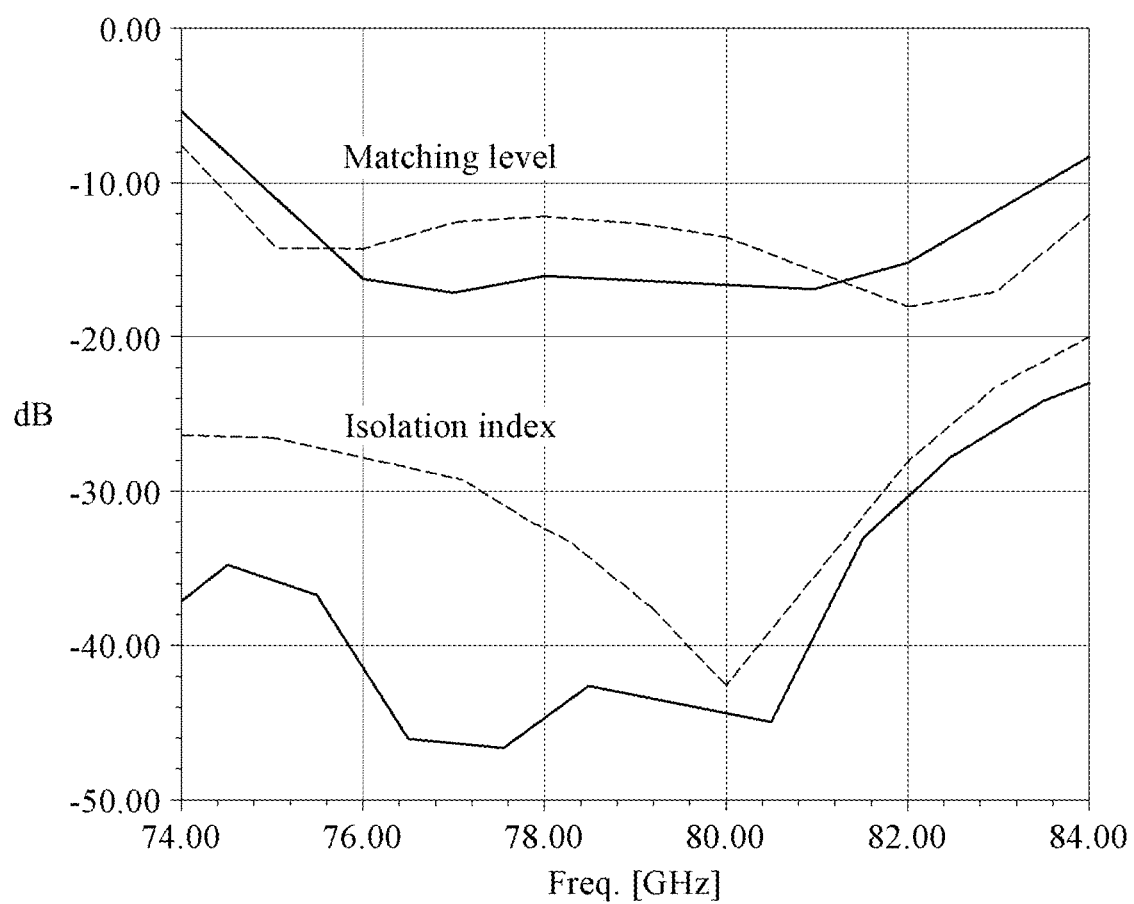
FIG. 13 illustrates an example of changes in a result isolation index and a matching level with respect to a 1-resonance structure and a 2-resonance structure in response to a signal being transmitted from a first antenna element to a second antenna element.

FIG. 13 illustrates an example of changes in a result isolation index and a matching level with respect to a 1-resonance structure and a 2-resonance structure in response to a signal being transmitted from a first antenna element to a second antenna element. The matching level may be related to the operation of antenna elements. In the example of FIG. 13, broken lines may represent the operation of a 1-resonance structure, and solid lines may represent the operation of a 2-resonance structure.

As shown in the graph of the example of FIG. 13, an isolation index in the considered bandwidth of about 77 GHz to 81 GHz may be less than −40 dB. In such an example, an allowable distance between planar re-radiating elements may be $\lambda/2$, with a tolerance of ±20%. By adjusting the parameters b2 and h2, such as discussed above, a result isolation index of the 2-resonance structure may reach its minimum value of −47 dB at the frequency of 77.6 GHz. By adjusting the parameters b1 and h1, the result isolation index of the 2-resonance structure may reach its minimum value of −44 dB at the frequency of 80.4 GHz. By adjusting the parameters b and h, a result isolation index of the 1-resonance structure may reach its minimum value of −42 dB at the frequency of 80 GHz. Accordingly, antenna element matching may change between −5 dB and −17 dB in the 2-resonance system, and may change between −8 dB and −19 dB in the 1-resonance system.

The size of the MIMO antenna array proposed herein may be reduced by about 4 times, by comparison to the size of alternative MIMO antenna arrays. Furthermore, implementation of the antenna array may reduce the length of feeding lines proportionally, and may reduce a resulting loss. To implement the antenna array, a predetermined dielectric material currently used for PCB may be applicable. For example, a material with an effective dielectric permittivity $\varepsilon_{\mathit{eff1}}$ may be used as a medium for the first antenna element, and a material with an effective dielectric permittivity $\varepsilon_{\mathit{eff2}}$ may be used as a medium for the second antenna element. In another example, a dielectric permittivity of a medium between planar re-radiating elements and radiating elements may be different from a dielectric permittivity of a medium between radiating elements and a grounding plate.

In addition, the following possible examples including the MIMO radar antenna array may achieve a lower isolation index for an antenna system.

First, the position of a reflective element may be adjusted. For example, the reflective element may be positioned on the same plane as planar re-radiating elements, or on a plane between a location plane of the planar re-radiating elements and a location plane of radiating elements. In another example, the reflective element may correspond to a composite reflective element. For example, the composite reflective element may correspond to a multilayer PCB. In such an example, one portion of the composite reflective element may be positioned on the same plane as the planar re-radiating elements, and a second portion of the composite reflective element may be positioned on the plane between the location plane of the planar re-radiating elements and the location plane of the radiating elements.

Second, different types of radiating elements and planar re-radiating elements may be used. For example, microstrips, slots or different combinations of such elements may be used.

Third, by disposing feeding lines next to the different portions of the radiating elements, the feeding lines may be shifted relative to the phase center of the radiating elements. For example, the feeding lines may be disposed at the center of the radiating elements, or one of the sides of the radiating elements.

Thus, the high-isolation characteristics may be achieved using the various parameters in various examples, while maintaining a relatively short distance between the transmission side, corresponding to the first antenna element, and the reception side, corresponding to the second antenna element. Examples include application to different fields. For example, examples include a sensor for robot navigation which is suitable to be used under a predetermined weather condition, a sensor for automotive navigation, for example, an image radar, or a target tracking radar, which is suitable to be used under a predetermined weather condition, and a multi-mode radar, for example, short-range, mid-range, and long-range radars.

Additional characteristics of systems and methods used in the operation of a transceiver for transmission and receipt of signals as discussed above are provided, below, such as with respect to components of the system and operations of the methods.

The antenna system 100, first antenna element 110, radiating elements 112 and 122, planar re-radiating elements 111 and 121, feeding elements 113 and 123, reflective element 130, grounding plates 141 and 142, planes 151 and 152 and other apparatuses, modules, devices, and other components described herein with respect to FIGS. 1-13 are implemented by hardware components configured to perform the operations described in this application are hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example one or more processors or computers, to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna system, comprising:
    a first antenna comprising first radiating components disposed along a plane and first planar re-radiating components disposed along another plane;
    a second antenna comprising second radiating components disposed along the plane and second planar re-radiating components disposed along the other plane; and
    reflective components positioned between the first planar re-radiating components and the second planar re-radiating components.

2. The antenna system of claim 1, wherein a portion of energy radiated by the first radiating components is reflected by the reflective components and received by the second radiating components.

3. The antenna system of claim 1, wherein, in response to energy being radiated by the first radiating components, a portion of the radiated energy is received by the second radiating components through the first planar re-radiating components and the second planar re-radiating components, and another portion of the radiated energy is received by the second radiating components through the reflective components.

4. The antenna system of claim 1, wherein the first radiating components and the second radiating components are configured as radiating matching pairs, the first planar re-radiating components and the second planar re-radiating components are configured as re-radiating matching pairs, and a distance between two radiating components included in one of the radiating matching pairs is less than a distance between two planar re-radiating components included in one of the re-radiating matching pairs.

5. The antenna system of claim 1, wherein the first planar re-radiating components, the second planar re-radiating components, and the reflective components are located on the same other plane.

6. The antenna system of claim 1, wherein the reflective components are grounded.

7. The antenna system of claim 1, wherein a distance between one of the first radiating components and one of the first planar re-radiating components is different from a distance between another one of the first radiating components and the one of the first planar re-radiating components.

8. The antenna system of claim 1, wherein the first radiating components and the second radiating components are configured as radiating matching pairs, and a distance between two radiating components included in one of the radiating matching pairs is different from a distance between two radiating components included in another one of the radiating matching pairs.

9. The antenna system of claim 1, wherein the first antenna further comprises first feeding components, and the second antenna further comprises second feeding components.

10. The antenna system of claim 9, further comprising:
a grounding plate positioned under the first antenna and the second antenna, wherein the first feeding components are connected to the grounding plate and the first radiating components, and the second feeding components are connected to the grounding plate and the second radiating components.

11. The antenna system of claim 1, further comprising:
a grounding plate positioned between the first radiating components and the second radiating components.

12. An antenna system, comprising:
a first antenna comprising a first radiating component disposed along a plane and a first planar re-radiating component disposed along another plane;

a second antenna comprising a second radiating component disposed along the plane and a second planar re-radiating component disposed along the other plane; and a reflective component positioned between the first antenna and the second antenna.

13. The antenna system of claim 12, wherein a portion of energy radiated by the first radiating component is reflected by the reflective component and received by the second radiating component.

14. The antenna system of claim 12, wherein, in response to energy being radiated by the first radiating component, a portion of the radiated energy is received by the second radiating component through the first planar re-radiating component and the second planar re-radiating component, and another portion of the radiated energy is received by the second radiating component through the reflective component.

15. The antenna system of claim 12, wherein a distance between the first radiating component and the second radiating component is less than a distance between the first planar re-radiating component and the second planar re-radiating component.

16. The antenna system of claim 12, wherein the first planar re-radiating component, the second planar re-radiating component, and the reflective component are located on the same other plane.

17. An antenna system, comprising:
a first antenna comprising a first radiating component and a first planar re-radiating component;

a second antenna comprising a second radiating component and a second planar re-radiating component; and a reflective component positioned between the first antenna and the second antenna, wherein the reflective component is grounded.

18. The antenna system of claim 12, wherein the first antenna further comprises a first feeding component connected to the first radiating component, and the second antenna further comprises a second feeding component connected to the second radiating component.

19. The antenna system of claim 12, further comprising:
a grounding plate positioned under the first antenna and the second antenna.

20. An antenna system, comprising:
a first antenna comprising a first radiating component disposed along a plane and a first re-radiating component disposed along another plane;

a second antenna comprising a second radiating component disposed along the plane and a second re-radiating component disposed along the other plane; and a reflective component positioned between the first antenna and the second antenna, configured to reflect a portion of energy radiated by the first radiating component to be received by the second radiating component.

21. The antenna system of claim 20, wherein a distance between the first radiating component and the second radiating component is less than a distance between the first planar re-radiating component and the second planar re-radiating component.

22. The antenna system of claim 20, wherein the reflective component is grounded.

* * * * *